United States Patent [19]

Li

[11] 4,125,461

[45] Nov. 14, 1978

[54] DEMULSIFICATION BY CENTRIFUGATION FOLLOWED BY STRONG SHEARING

[75] Inventor: Norman N. Li, Edison, N.J.

[73] Assignee: Exxon Research & Engineering Co., Linden, N.J.

[21] Appl. No.: 816,290

[22] Filed: Jul. 18, 1977

Related U.S. Application Data

[63] Continuation-in-part of Ser. No. 677,527, Apr. 16, 1976, abandoned.

[51] Int. Cl.$^2$ .............................................. B01D 13/00
[52] U.S. Cl. ..................................... 210/22 R; 210/21
[58] Field of Search .............................. 210/21, 22, 49

[56] References Cited

U.S. PATENT DOCUMENTS

| | | | |
|---|---|---|---|
| 2,413,375 | 12/1946 | Pomeroy | 210/49 X |
| 3,644,214 | 2/1972 | Akell | 210/21 X |
| 4,001,109 | 1/1977 | Li et al. | 210/21 X |

*Primary Examiner*—Frank A. Spear, Jr.
*Attorney, Agent, or Firm*—Ernest A. Forzano; David W. Collins

[57] ABSTRACT

A process for demulsifying an emulsion containing a continuous phase and a dispersed phase comprising removing a portion of the continuous phase, combining the remaining emulsion with a liquid miscible with the dispersed phase and applying a mechanical shearing stress to the resulting combination.

27 Claims, No Drawings

DEMULSIFICATION BY CENTRIFUGATION FOLLOWED BY STRONG SHEARING

CROSS-REFERENCE TO RELATED APPLICATIONS

This application is a continuation-in-part of U.S. Ser. No. 677,527, filed Apr. 16, 1976 in the name of Norman N. Li, now abandoned.

BACKGROUND OF THE INVENTION

The invention relates to a process for demulsifying an emulsion. An emulsion consists of two immiscible liquid phases in which one liquid forms a dispersed phase of minute droplets suspended in the continuous phase of the other liquid. In time, the dispersed phase of the emulsion will coalesce to also form a continuous phase. At this time, the emulsion will no longer exist but is replaced by two continuous phases separated by a single interface. The time necessary for the emulsion to demulsify can be many years, depending on the emulsifier contained in the emulsion and the viscosities of the two phases in the emulsion. Many industrial processes require the demulsification of an emulsion, for example, the processing of crude oil may require the removal of emulsified water.

It is often desirable during an industrial process to create an emulsion that is very stable with respect to the separation of the phases, e.g. emulsions used in liquid membrane processes. However, this stability against separation makes it difficult to intentionally demulsify the emulsion if it is necessary to do so at a later stage in the industrial process. No general rule exists for demulsifying an emulsion. Several methods have been tried with varying degrees of success, depending on the emulsifier contained in the emulsion. However, the standard methods work less well or not at all as the emulsion becomes more stable. The standard methods include settling, heating, electrical coalescence and precipitation, centrifugation, filtration, use of chemicals or combinations thereof. For example, U.S. Pat. No. 2,338,986 discloses the demulsification of the emulsion that collects at the interface when an oil and water dispersion is allowed to settle. The emulsion is demulsified by combining with water and agitated by pumping the combination through a centrifugal pump or a restricted orifice. However, this method doesn't work for a very stable emulsion. The present invention provides a new means for breaking very stable emulsions.

SUMMARY OF THE INVENTION

The present invention is, broadly, a process for separating the liquid dispersed phase which is present as droplets from the liquid continuous phase of an emulsion. The weight ratio of the dispersed phase to the continuous phase of the emulsion is increased. This ratio may be increased by adding dispersed phase to the internal phase of the emulsion or by removal of a portion of the continuous phase of the emulsion, the preferable method is removal of a portion of the continuous phase. In either case, in the resultant emulsion the continuous phase of the emulsion is "thinned out" in relation to the dispersed phase as compared to the relation of these phases in the original emulsion. A portion of the continuous phase may be removed by any method capable of such known in the art. These methods include centrifugation, settling and heating. Some of these removal methods are more compatible with some emulsions formulations rather than others. Those skilled in the art of emulsions will be able to select, from the removal methods cited above as well as other methods known in the art, the most compatible method of removal of a portion of the continuous phase in light of the emulsion's formulation, etc. The most preferable method of removal is centrifugation.

Once the weight ratio of the dispersed phase to the continuous phase has been increased to the extent required, as described in detail below, the resultant emulsion is combined with a liquid miscible with the dispersed phase and a mechanical shearing stress is applied to this combination so that the continuous phase between adjacent droplets of the dispersed phase is ruptured, allowing the coalescence of a substantial portion of the dispersed phase.

It is this novel combination of steps: the increasing of the ratio of the dispersed phase to the internal phase of the emulsion; the combining of the resultant emulsion with a liquid miscible with the dispersed phase of the emulsion and shearing this resultant combination, that unexpectedly produces the coalescence of a substantial portion of the dispersed phase of the emulsion where the other methods of the prior art fail.

In one embodiment, the above process is combined with a liquid membrane process. In another embodiment, the weight ratio of the dispersed phase to the continuous phase is increased by centrifuging to separate a portion of the continuous phase from the emulsion.

DESCRIPTION OF THE PREFERRED EMBODIMENT

It is to be understood in the following discussion that the emulsion is to be characterized as a dispersed phase in a continuous phase. In particular, a water-in-oil emulsion is an emulsion in which the dispersed phase is a water miscible liquid distributed in a continuous phase which is a water immiscible liquid. Similarly, an oil-in-water emulsion is an emulsion in which the dispersed phase is a water immiscible liquid distributed in a continuous phase which is a water miscible liquid.

It is known in the art that various emulsions are difficult to break. Especially difficult are those emulsions intentionally created to be very stable, e.g., emulsions useful in liquid membrane processes. The liquid membrane water treating process, to function effectively, requires a water-in-oil emulsion wherein the oil maintains its integrity as the continuous phase of the emulsion under various conditions of heat, pressure and agitation in order to function as a membrane. Thus, the emulsions useful in this process are designed to be especially stable. The formation of stable liquid membrane emulsions is an art in itself and the difficulties and solutions to those difficulties may be found in U.S. Pat. No. 3,779,907 herein incorporated by reference to define one class of emulsions which are especially suitable for demulsifying (by the process of the instant invention). As may be read from this patent, the liquid membrane emulsion may comprise a reagent containing water phase emulsified in an oil phase, the oil phase comprising an emulsifier and preferably various polar additives which have the effect of increasing the stability of the emulsion by (1) increasing the viscosity of the hydrocarbon phase, (2) increasing the interaction between the additives and the surfactants in the oil phase, and (3) increasing the surface activity of the oil phase.

A liquid membrane emulsion may also comprise an oil internal phase dispersed in a surface active water phase. The water phase contains the necessary emulsifier and additives. The formation of these types of liquid membrane emulsions may be found in U.S. Pat. No. 3,719,590 and U.S. Pat. No. 3,410,794 which are incorporated herein by reference.

It should be noted that it is possible that a single compound can act both as emulsifier and membrane strengthening additive. These water-in-oil and oil-in-water emulsions, while suitable for liquid membrane processes because of their stability, are difficult to demulsify. However, it is often necessary to separate the oil and water phases for separate reclamation of the components present therein. Prior art demulsifying processes include settling, heating polyvalent flocculating salts, electrostatic precipitation, centrifuging, are completely unsuitable for demulsifying these emulsions.

It has unexpectedly been discovered that these very stable emulsions can be demulsified by first removing a portion of the continuous phase, combining the remaining portion of the emulsion with a liquid miscible with the dispersed phase to increase the tendency of emulsion inversion and applying a mechanical shearing stress to the resulting combination.

A portion of the continuous phase is first removed by any means capable of doing so for a very stable emulsion. A preferred means is centrifugation (e.g., at 2000 to 10,000 rpm for 5 to 60 min.). The amount of the continous phase that must first be removed in order that the emulsion be demulsified by the remaining steps of the process is determined by the original weight ratio of the dispersed phase to the continuous phase of the emulsion and the desired final weight ratio of the dispersed phase to the continuous phase. An amount should be removed so that after removal, the weight ratio of the dispersed phase to the continuous phase should be greater than 3:2. An advantageous weight ratio is 5:1 because the amount of added liquid that is added in the next step of the process may be reduced as is discussed below. For example, if the emulsion to be demulsified had a weight ratio of dispersed to continuous phases of 1:2, about 90% of the continuous phase should be removed in order to reduce the final weight ratio to 5:1. The remaining portion of the emulsion is a viscous jelly-like substance.

After a portion of the continuous phase is removed as described above, the remaining portion of the emulsion (hereafter referred to as "gel") is combined with any liquid (hereafter referred to as "added liquid") miscible with the dispersed phase of the emulsion. Thereafter, a mechanical shearing force is applied to the combination, causing a substantial separation of the phases of the emulsion.

The weight ratio of the added liquid to the gel is important to the demulsifying of the emulsion. In general, a ratio of 10:1 is sufficient for demulsification. However, depending on the stability of the emulsion, as the amount of the continuous phase that is removed in the initial steps of the process is increased then the weight ratio of the added liquid to the gel may be decreased. For example, if the weight ratio of the dispersed phase to the continuous phase is greater than 5:1, then the weight ratio of the added liquid to the gel may be decreased to about 4:1.

A mechanical shearing stress is applied to the mixture of gel and added liquid so that the continuous phase between adjacent droplets of the dispersed phase is ruptured, allowing the coalescence of a substantial portion of the dispersed phase. A preferred means is the use of rotating blades as in a conventional blender. In the particular Examples 1, 2 and 3 below, a "Waring" blender made by Dynamics Corporation of America is used to supply the mechanical shearing stress. Of course, other applications of the method of the present invention would require an equivalent to the blender depending on the materials and the quantities being processed.

Other devices which are usually used to emulsify two phases may be used to supply the mechanical shearing stress to demulsify an emulsion according to the present invention. For example, some suitable devices are based on the principle of impinging two streams to be emulsified at high velocity at either a stationary or rotating disc. Another type of device pumps a mixture of the two phases to be emulsified through two concentric cylinders with grinding gears or teeth, one of the cylinder being a stator and the other a rotor. Such stator-rotor assemblies are the T-series manufactured by the Tekmar Company.

If the rotating blades of a mixer are used to supply the shearing stress, then, as a practical matter, it may be necessary to place the added liquid in combination with the gel so that the added liquid covers a portion of the blades, otherwise the viscous gel may stick to and rotate with the blades, preventing the blades from transferring sufficient mechanical energy to the gel to rupture the film of continuous phase between adjacent droplets of the dispersed phase.

It is to be appreciated that mixing is one of the most common methods of creating emulsions. Therefore, the use of a mixing means to provide the mechanical shearing stress to demulsify an emulsion is remarkable, indeed.

Total separation of the two immiscible phases of the emulsion is very difficult because a small fraction of the dispersed phase may remain emulsified. An upper limit of this fraction is determined by the particular characteristics of two immiscible phases and the contained emulsifier. For a given set of materials, the continuous phase can only emulsify a given amount of dispersed phase. It then follows that since we have removed a substantial portion of the continuous phase in the initial step of the process, the maximum amount of the dispersed phase in the remaining continuous phase will be substantially less than the original amount of dispersed phase.

In addition, the original continuous phase represents, at the time the shearing step commences, a small percentage by weight of the total liquid. Therefore, there is a tendency for the original continuus phase to become a dispersed phase in the now continuous phase of the original dispersed phase. This tendency of forming an oil-in-water emulsion counteracts the tendency of forming a water-in-oil emulsion by the emulsifier and reduces the amount of remaining dispersed phase below the possible upper limit. This phase ratio effect on emulsion formation helps also in demulsifying the gel in a high shear mixer.

The following are specific embodiments of the present invention:

Several materials are defined below that are used in the examples that follow.

LIX 65N is a $\beta$-hydroxy benzophenme oxime.

Saponin, a surface active agent in the group of anionic surfactants, is better known as sapogeninglycoside.

It is a type of glycoside which is widely distributed in plants. All saponins foam strongly when shaken with water. They form oil-in-water emulsions and act as protective colloids. Each saponin molecule consists of a sapogenin which constitutes the aglucon moiety of a molecule and a sugar. The sapogenin may be a stearoid or a triturpene and a sugar moiety may be glucose, galactose, pentose or a methyl pentose. Saponin has been hypothesized according to "Hackh's chemical Dictionary" by Julius Grant, Third Edition, 1944 (McGraw-Hill Book Company, Inc.), as having a formula $C_{32}H_{54}O_{18}$ and a molecular weight of 726.5.

S100N and Isopar M are defined by their physical properties.

| Solvent | Carbon Number | % Aromatics | Sp.Gr. at 60° F. | Flash Pt. (° F.) | Kin. Vis. (c.s.) |
|---|---|---|---|---|---|
| S100N | ~35 | ~9 | .865 | 380 | 22.6 (100° F) |
| IsoparM | ~20 | 0.2 | .784 | 170 | 3.14 (77° F) |

Polyamine derivative or ENJ-3029 is a mixture of

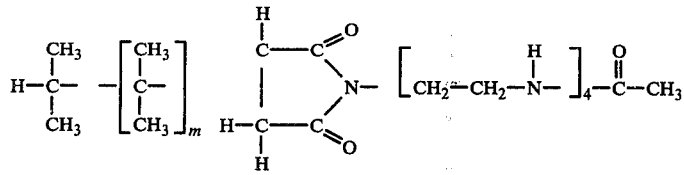

and

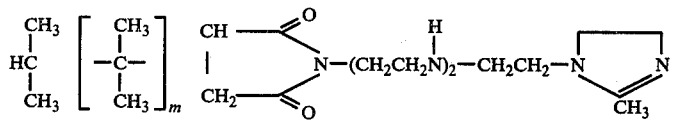

wherein m is an integer of about 40, giving said polyamine derivative a molecular weight of about 2000.

EXAMPLE 1

Demulsification by Settling

All the emulsions described in Ex. 2 to 5 do not break by settling. Simple experiments can be done by placing the emulsions in graduated cylinders. Let the emulsions stand still with time. If partial demulsification occurs, one should observe three phases in a graduated cylinder, i.e. an oil phase on the top, an unbroken phase in the middle, and an aqueous phase, which was the dispersed phase, at the bottom. With the emulsions mentioned, one does not see the three phases in a graduated cylinder even after long time — there are two emulsions (with different formulation) that have remained stable in our laboratory for more than three years. The only change in these two emulsions is that there is roughly 10% oil on top of the emulsion. This indicates that some excess amount of oil used in forming the emulsion has accumulated after this long time. The emulsions are not broken because there is no observable amount of the encapsulated (or dispersed) phase broken out, which if happened, will form a bottom phase.

EXAMPLE 2

Demulsification by Mixing

In this experiment, an emulsion which comprises a continuous phase of 15% Active Lix 64N, 2% ENJ-3029, 83% Isopar M, and a dispersed phase of 17.7% $CuSO_4.5H_2O$, 5.7% $H_2SO_4$, 76.6% $H_2O$ and a ratio of continuous to dispersed phase of 2:1. The emulsion was mixed with various liquid phases as listed in Table I in a "Waring" blender for 4 minutes at 15,000 rpm. The mixing was stopped every minute and observation for demulsification was made. No demulsification was observed. The results are shown in Table I.

TABLE I

Demulsification by Mixing

Emulsion used in the tests:
Continuous Phase = 15% Active Lix 64N, 2% ENJ-3029, 83% Isopar M
Dispersed Phase = 17.7% $CuSO_4 . 5H_2O$, 5.7% $H_2SO_4$, 76.6% $H_2O$ $\dfrac{\text{Dispersed}}{\text{Continuous}}$ wt. ratio = 1:2

Apparatus used in the tests: 1-liter size Waring blender with a max. rpm of 15,000.

| Mixing System | Results |
|---|---|
| (1) 5 gm emulsion + 4 gm toluene + 7 gm hexane | No demulsification |
| (2) 6 gm emulsion + 8 gm hexane | No demulsification |
| (3) 5 gm emulsion + 5 gm hexane + 5 gm Isopar M | No demulsification |
| (4) 6 gm emulsion + 6 gm water | No demulsification |
| (5) 6 gm emulsion + 60 gm water | No demulsification |

EXAMPLE 3

Demulsification According to the Present Invention

An emulsion comprising the same ingredients in the same amounts as in Experiment 1 was centrifuged at 4000 rpm for 30 minutes to remove about 90% of the continuous phase. The remaining emulsion became a viscous gel. The gel was mixed with an aqueous solution of $CuSO_4$ (12.5%) and $H_2SO_4$ (11.7%) at different weight ratios as indicated below in Table II in the same model Waring blender operated as in Example 1. A ratio of added liquid to gel of 10:1 produced substantial demulsification. The results are shown in Table II.

TABLE II

Demulsification According to the Present Invention

| Amt. of Gel in Blender (g) | Amt. of Added Aqueous Solution in Blender (g) | Wt. Ratio of Added Liquid Gel | Results |
|---|---|---|---|
| 40 | 160 | 4/1 | No demulsification |
| 50 | 200 | 4/1 | No demulsification |
| 50 | 250 | 5/1 | No demulsification |
| 50 | 492 | 10/1 | Substantial demulsification |

EXAMPLE 4

An emulsion comprising a continuous phase of 15% Lix 64N, 2% ENJ-3029, 83% Isopar M and a dispersed phase of 11 gm $H_2SO_4$ + 98 gm $CuSO_4.5H_2O$ in 0.5 liter water and a weight ratio of dispersed to continuous phase of 1:1. The emulsion was centrifuged at 4000 rpm for 30 min. to remove about 55.6% oil. The remaining emulsion became viscous gel. The gel was mixed with aqueous solution containing 11.8% $CuSO_4$, 17.7% $H_2SO_4$, and 70.5% $H_2O$ in the same model Waring blender operated as in Example 1. This example is presented to show an emulsion different from that of Example 2 displaying similar demulsification behavior with respect to the weight ratio of the added liquid to gel. The results are shown in Table III.

EXAMPLE 5

Demulsification According to the Present Invention

An emulsion comprising a continuous phase of 0.2% Saponin, 70% glycerol, and 29.8% $H_2O$ and a dispersed phase of 50% each toluene and heptane was centrifuged at 10,000 rpm for 15 min. to remove about 97% membrane phase. The remaining emulsion became a viscous gel. The gel was mixed with a hydrocarbon phase identical to the dispersed phase, i.e. toluene and heptane at 50% (by wt.) each in the same model Waring blender operated as in Example 1. A ratio of added liquid to gel of 10:1 mixed for 1 minute produced substantial demulsification. In another experiment, another portion of the gel was mixed with a hydrocarbon phase consisting of 100% S100 N at an added hydrocarbon to gel phase wt. ratio of 10/1 mixed for 1 minute. Again, substantial demulsification of the gel was obtained. The results are shown in Table IV.

TABLE IV

Demulsification According to the Present Invention

Emulsion used in the tests:
  Continuous Phase = 0.2% Saponin, 70% glycerol, 29.8% $H_2O$
  Dispersed Phase = 50% Toluene and 50% Heptane $\dfrac{\text{Dispersed}}{\text{Continuous}}$ wt. Ratio = 1:2

| Amt. of Gel in Blender (g) | Kind of Hydrocarbon Solution Added in Blender | Amt. of Hydrocarbon Solution Added in Blender (g) | Wt. Ratio Added HCNs Gel Solu'n | Results |
|---|---|---|---|---|
| 9 | 1/1 Toluene/Heptane | 90 | 10/1 | Substantial demulsification |
| 7 | S100N | 70 | 10/1 | Substantial demulsification |

What is claimed is:

1. A process for separating a liquid dispersed phase present as droplets in a liquid continuous phase of an emulsion comprising:
   (a) increasing the weight ratio of the liquid dispersed phase to the liquid continuous phase of the emulsion by removal of a portion of the continuous phase of the emulsion;
   (b) combining the remaining emulsion with a liquid miscible with said liquid dispersed phase of said emulsion;
   (c) shearing the resulting combination so that said continuous phase between adjacent droplets of said dispersed phase is ruptured such that a substantial portion of said dispersed phase is coalesced and

TABLE III

Demulsification According to the Present Invention

Emulsion used in the tests:
  Continuous Phase = 15% Lix 64N, 2% ENJ-3029, 83% Isopar M
  Dispersed Phase = 11 gm $H_2SO_4$ + 08 gm $CuSO_4 . 5H_2O$ in 0.5 liter water $\dfrac{\text{Dispersed}}{\text{Continuous}}$ M.E. wt. ratio = 1:1

| Mixing Time in a Waring Blender (Min.) | Amt. of Gel in Blender (gm) | Amt. of Added Aqueous Solution in Blender (g) | Wt. Ratio of Added Liquid Gel Solution | Results |
|---|---|---|---|---|
| (I) | | | | |
| 1 | 40 | 160 | 4/1 | No demulsification |
| 2 | 40 | 160 | 4/1 | No demulsification |
| (II) Resume mixing, used 50 gm of the gel from (I) | | | | |
| 1 | 50 | 400 | 8/1 | Most of the gel broke into oil and aq. layers. |

Recovered 13 gm very light emulsion and 435 gm aq. solution.

said dispersed phase and miscible liquid separate from said continuous phase.

2. The process of claim 1 wherein the weight ratio of the dispersed phase to continuous phase after the step of removing a portion of the continuous phase is greater than 3:2.

3. The process of claim 1 wherein the weight ratio of the dispersed phase to continuous phase after the step of removing a portion of the continuous phase is greater than 5:1.

4. The process of claim 1 wherein the step of shearing is by a mixer.

5. The process of claim 3 wherein the step of combining the remaining emulsion with a liquid miscible with said dispersed phase of said emulsion is performed such that the weight ratio of said liquid miscible with said dispersed phase to said remaining emulsion is greater than 4:1.

6. The process of claim 1 wherein the step of combining the remaining emulsion with a liquid miscible with said dispersed phase of said emulsion is performed such that the weight ratio of said liquid miscible with said dispersed phase to said remaining emulsion is greater than 10:1.

7. The process of claim 1 wherein the dispersed phase is miscible with water and the continuous phase is miscible with oil.

8. The process of claim 1 wherein the dispersed phase is miscible with oil and the continuous phase is miscible with water.

9. In a liquid membrane process for removing a dissolved component from a feedstream which includes contacting said feedstream with a liquid-liquid emulsion which is characterized as having a continuous phase which is immiscible with said feedstream and yet permeable by said dissolved component, a dispersed phase in which said permeable component is soluble, the improvement which comprises contacting said emulsion with said feedstream for a time and at conditions sufficient to permeate a substantial portion of said dissolved component into said dispersed phase, separating said emulsion from said feedstream, demulsifying said emulsion by
(a) increasing the weight ratio of the dispersed phase to the continuous phase of the emulsion by removal of a portion of the continuous phase of the emulsion;
(b) combining the resultant emulsion with a liquid miscible with said dispersed phase of said emulsion;
(c) applying a mechanical shearing stress to the resulting combination; and
(d) terminating said shearing stress and allowing the mixture to separate into an oil and water layer.

10. The process of claim 9 wherein the weight ratio of the dispersed phase to continuous phase after the step of increasing said weight ratio is greater than 3:2.

11. The process of claim 9 wherein the weight ratio of the dispersed phase to continuous phase after the step of increasing said weight ratio is greater than 5:1.

12. The process of claim 10 wherein the step of increasing said weight ratio is by removing a portion of said continuous phase by centrifugation.

13. The process of claim 9 wherein the step of applying a mechanical shearing stress is by a mixer.

14. The process of claim 11 wherein the step of combining the resultant emulsion with a liquid miscible with said dispersed phase of said emulsion is performed such that the weight ratio of said liquid miscible with said dispersed phase to said resultant emulsion is greater than 4:1.

15. The process of claim 9 wherein the step of combining the resultant emulsion with a liquid miscible with said dispersed phase of said emulsion is performed such that the weight ratio of said liquid miscible with said dispersed phase to said resultant emulsion is greater than 10:1.

16. The process of claim 9 wherein said emulsion is an oil-in-water emulsion.

17. The process of claim 9 wherein said emulsion is water-in-oil water.

18. In a process for separating components of a mixture of water immiscible liquids which includes emulsifying a water immiscible mixture wherein individual emulsified droplets are formed, coating said droplets with a liquid surfactant membrane, said membrane selectively permeating at least one component of said mixture more rapidly than at least one other component, the improvement which comprises washing said coated droplets with an added solvent whereby at least a portion of said more permeable components is dissolved in said solvent, separating said more permeable component from said solvent, separating the less permeable component by demulsifying the remaining liquid-liquid emulsion by:
(a) increasing the weight ratio of the dispersed phase to the continuous phase of the emulsion by removal of a portion of the continuous phase of the emulsion;
(b) combining the resultant emulsion with a liquid miscible with said dispersed phase of said emulsion;
(c) applying a mechanical shearing stress to the resulting combination; and
(d) terminating said shearing stress and allowing the mixture to separate into an oil and water layer.

19. The process of claim 18 wherein the weight ratio of the dispersed phase to continuous phase after the step of increasing said weight ratio is greather than 3:2.

20. The process of claim 18 wherein the weight ratio of the dispersed phase to continuous phase after the step of increasing said weight ratio is greater than 5:1.

21. The process of claim 19 wherein the step of increasing said weight ratio is by removing a portion of said continuous phase by centrifugation.

22. The process of claim 18 wherein the step of applying a mechanical shearing stress is by a mixer.

23. The process of claim 20 wherein the step of combining the resultant emulsion with a liquid miscible with said dispersed phase of said emulsion is performed such that the weight ratio of said liquid miscible with said dispersed phase to said resultant emulsion is greater than 4:1.

24. The process of claim 18 wherein the step of combining the resultant emulsion with a liquid miscible with said dispersed phase of said emulsion is performed such that the weight ratio of said liquid miscible with said dispersed phase to said resultant emulsion is greater than 10:1.

25. The process of claim 18 wherein the water immiscible liquids are hydrocarbons.

26. The process of claim 1 wherein the weight ratio of the liquid dispersed phase to the liquid continuous phase of the emulsion is increased by removing a portion of the liquid continuous phase of the emulsion by centrifugating.

27. The process of claim 1 wherein the step of increasing said weight ratio is by removing a portion of said continuous phase by centrifugation.

* * * * *